United States Patent [19]

Yanko

[11] Patent Number: 4,565,270
[45] Date of Patent: Jan. 21, 1986

[54] FRICTION CLUTCH CONVERTIBLE FOR EITHER PUSH-TYPE OR PULL-TYPE DISENGAGEMENT

[75] Inventor: John P. Yanko, Liverpool, N.Y.
[73] Assignee: Lipe-Rollway Corporation, Syracuse, N.Y.
[21] Appl. No.: 454,890
[22] Filed: Nov. 14, 1983
[51] Int. Cl.⁴ .............................................. F16D 13/50
[52] U.S. Cl. .............. 192/70.13; 192/70.29; 192/70.30; 192/98; 192/99 A
[58] Field of Search ............. 192/70.13, 70.29, 70.30, 192/91 A, 98, 99 A

[56] References Cited

U.S. PATENT DOCUMENTS

| | | | |
|---|---|---|---|
| 1,707,034 | 3/1929 | Wemp | 192/70.13 |
| 2,060,773 | 11/1936 | Pearmain | 192/99 A X |
| 2,765,060 | 10/1956 | Stenger | 192/99 A |
| 2,788,876 | 4/1957 | Spase et al. | 192/99 A |
| 3,533,494 | 10/1970 | Spokas et al. | 192/70.29 X |
| 3,590,968 | 7/1971 | Binder | 192/70.29 X |
| 3,892,302 | 7/1975 | Rist | 192/70.3 X |
| 4,034,836 | 7/1977 | Sink et al. | 192/70.29 X |
| 4,157,749 | 6/1979 | Sink et al. | 192/99 A |
| 4,238,019 | 12/1980 | Maucher et al. | 192/70.30 X |

Primary Examiner—Rodney H. Bonck
Assistant Examiner—David D. House
Attorney, Agent, or Firm—Bruns and Wall

[57] ABSTRACT

A friction clutch constructed so that it can operate as either a push or a pull type clutch with only a minimal change in parts. The parts for the two types of clutches are interchangeable except for the release levers and release bearings. This simplifies the tooling and greatly reduces parts inventories.

5 Claims, 3 Drawing Figures

FRICTION CLUTCH CONVERTIBLE FOR EITHER PUSH-TYPE OR PULL-TYPE DISENGAGEMENT

BACKGROUND OF THE INVENTION

This invention relates generally to friction clutches, and has particular reference to a novel clutch construction that enables the clutch to operate as either a push or pull type clutch with only a minimal change in working parts.

As is well known in the art, the free inner ends of the release levers of heavy duty vehicular clutches may be either pushed or pulled by the release mechanism to disengage the clutch. Pull type clutches are used primarily when it is desired to utilize a clutch brake, and clutch brakes are normally employed in connection with relatively large, non-synchronized transmissions where there are high inertial forces. Push type clutches are usually cheaper to make and therefore are used in connection with smaller transmissions where clutch brakes are not needed.

Heretofore, push and pull type clutches have had quite different constructions, particularly with respect to the disengagement mechanisms, and this has required clutch manufacturers to maintain two different kinds of tooling and separate parts inventories all of which increases the cost of manufacture. Accordingly, there exists a need for a clutch construction that will enable the clutch to be built as either a push or pull type in an economical and efficient manner.

SUMMARY OF THE INVENTION

The friction clutch of the present invention is constructed so that it can operate as either a push or a pull type clutch with only a minimal change in parts. Thus, the parts for the two types of clutches are interchangeable except for the release levers and release bearings. This, of course, simplifies the tooling and greatly reduces parts inventories.

To the best of applicant's knowledge, a push/pull clutch construction having mostly interchangeable parts has not been developed before. In the course of a preliminary search, U.S. Pat. Nos. 3,892,302; 4,034,836 and 4,157,749 were developed but it is believed that these patents do not anticipate the present invention. U.S. Pat. No. 3,892,302 to M. Rist discloses a clutch having two assemblies one of which apparently has a pull type action and the other a push type action. However, the construction disclosed does not achieve, or attempt to achieve, the result obtained by the invention.

U.S. Pat. Nos. 4,034,836 and 4,157,749, both issued to W. H. Sink et al, are related to one another and disclose identical clutch constructions. In these patents, FIG. 1 illustrates a pull type clutch while FIG. 8 illustrates a push type. These are essentially two different embodiments of the same clutch but many of the parts are different and thus not interchangeable.

DESCRIPTION OF THE PREFERREED EMBODIMENT

Figure 2:
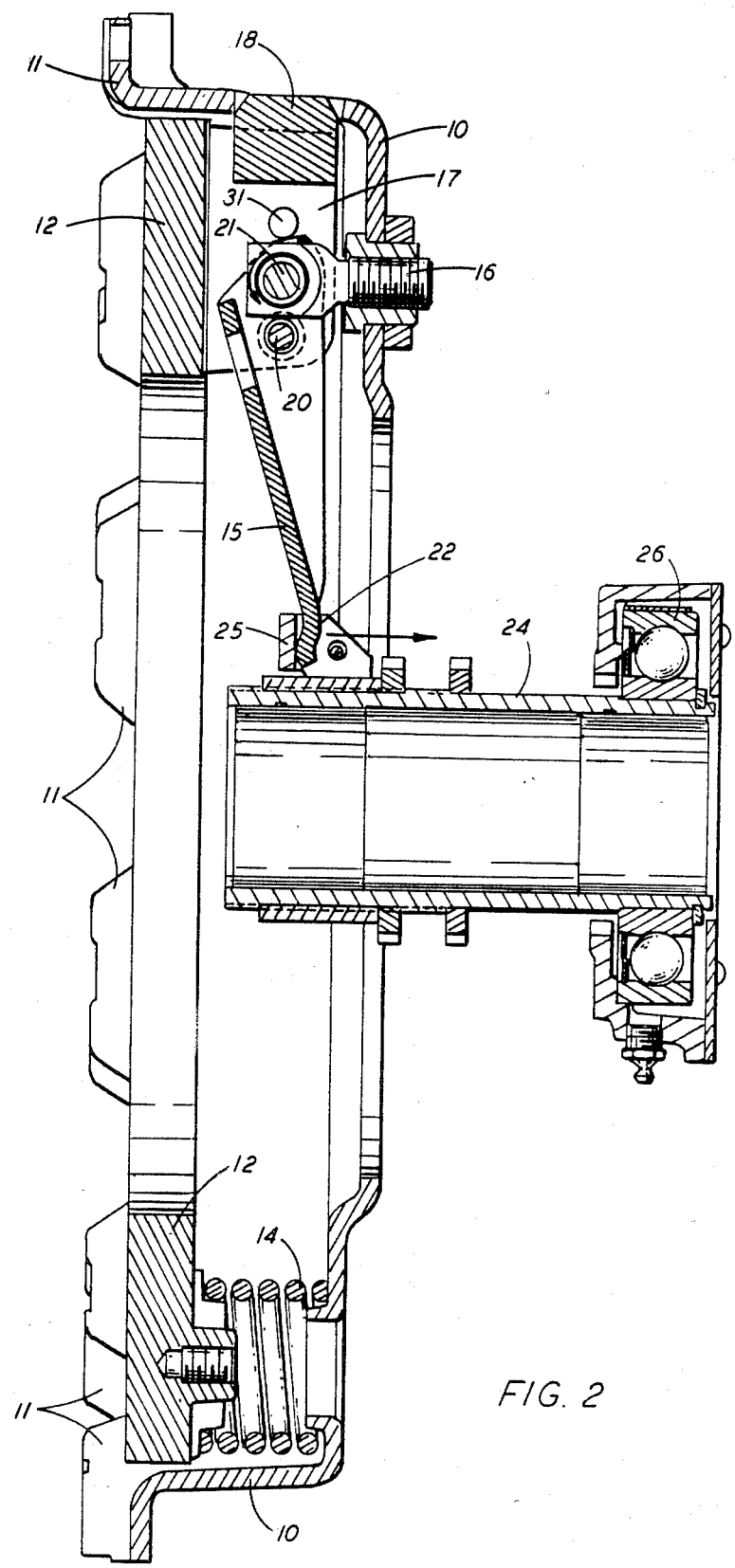
FIG. 2 vertical section through the clutch taken substantially on line 2—2 of FIG. 1.

Referring now to the drawings, and with particular reference to FIG. 2, the clutch disclosed herein includes a dished cover member 10 having a plurality of bosses 11 by means of which the cover member can be secured to a driving member in the form of a flywheel (not shown). Positioned in the cover member is an axially movable annular pressure plate 12 that is strongly biased toward the flywheel by compression springs 14. As is conventional, an axially movable friction disc (not shown) is positioned between the pressure plate 12 and the flywheel, and when the clutch is engaged the disc is frictionally engaged by the pressure plate and flywheel whereby it is driven by the latter.

Friction discs of the type employed in the clutch of the invention are disclosed in U.S. Pat. No. 2,863,537 to R. S. Root, which patent is owned by the assignee of this application. The Root patent discloses a pull type clutch incorporating a clutch brake. The friction disc of the invention has a central hub that is connected to the driven shaft (not shown) through a splined connection substantially as shown in the Root patent.

Figure 1:
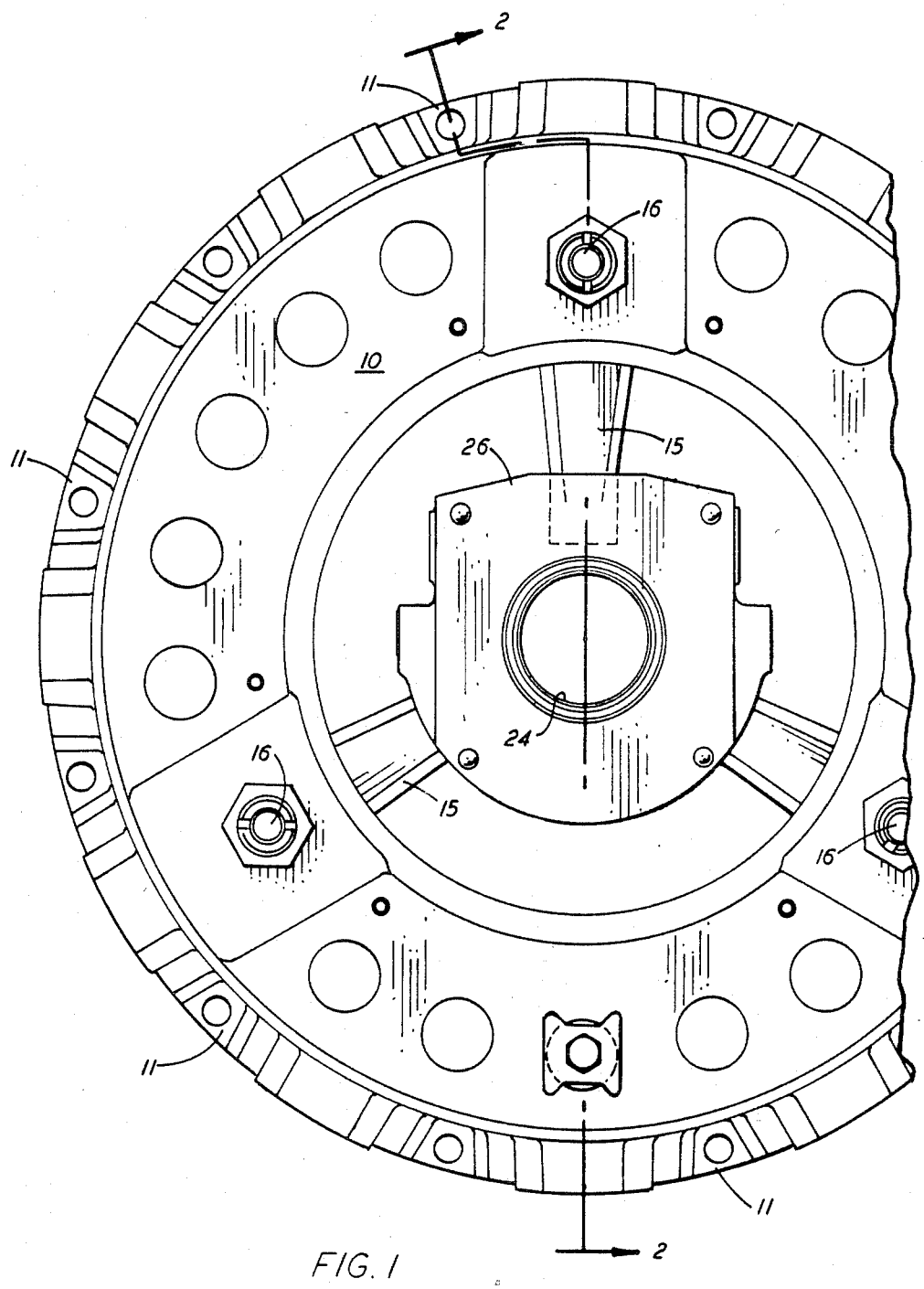
FIG. 1 is a fragmentary right end elevation of a pull type clutch embodying the invention.

The driving connection between the driving and driven members of the clutch is disengaged by moving the pressure plate rearwardly (or to the right as viewed in FIGS. 2 and 3), against the bias of springs 14, by means of release levers 15, only one of which is shown. There are three such levers disposed at 120° intervals around the clutch as indicated in FIG. 1. The levers 15 are channel shaped, and each lever is pivotally connected adjacent its outer end to the cover member 10 by a conventional eye bolt assembly 16, FIG. 2.

At each release lever location, the pressure plate 12 has a pair of rearwardly projecting lugs 17 that straddle the release lever and its eye bolt assembly. A guide block 18 fixed to the cover member 10 projects inwardly from the cover member and in between the lugs 17 as indicated in FIG. 2 to guide the pressure plate in its limited axial movement.

Each release lever 15 is pivotally connected to a pivot pin extending between the lugs 17 as well as to its cover plate eye bolt assembly 16. In the pull type clutch of FIG. 2, this pivot pin 20 is located below the eye bolt pivot point 21 as shown. With this arrangement, when the inner, free end 22 of the release lever is pulled rearwardly, or to the right in FIG. 2, the lever pivots in the counter clockwise direction about the eye bolt pivot point 21 which operates to move the pressure plate 12 to the right and disengages the clutch. During this pivotal movement, the eye bolt pivot point 21 acts as a fulcrum for the pivot connection at 20 between the release lever and pressure plate lugs 17.

The actuating means for the release levers 15 is conventional and can be similar to that described in U.S. Pat. No. 2,863,537, cited above. Briefly, this actuating means or release mechanism comprises a sleeve 24 that is axially slidable on the driven shaft, the forward end of the sleeve having brackets 25 welded thereto in which the free ends 22 of the release levers are received. At its rear end, the sleeve 24 carries the usual clutch release bearing 26 that is engaged in conventional manner by a yoke (not shown).

Figure 3:
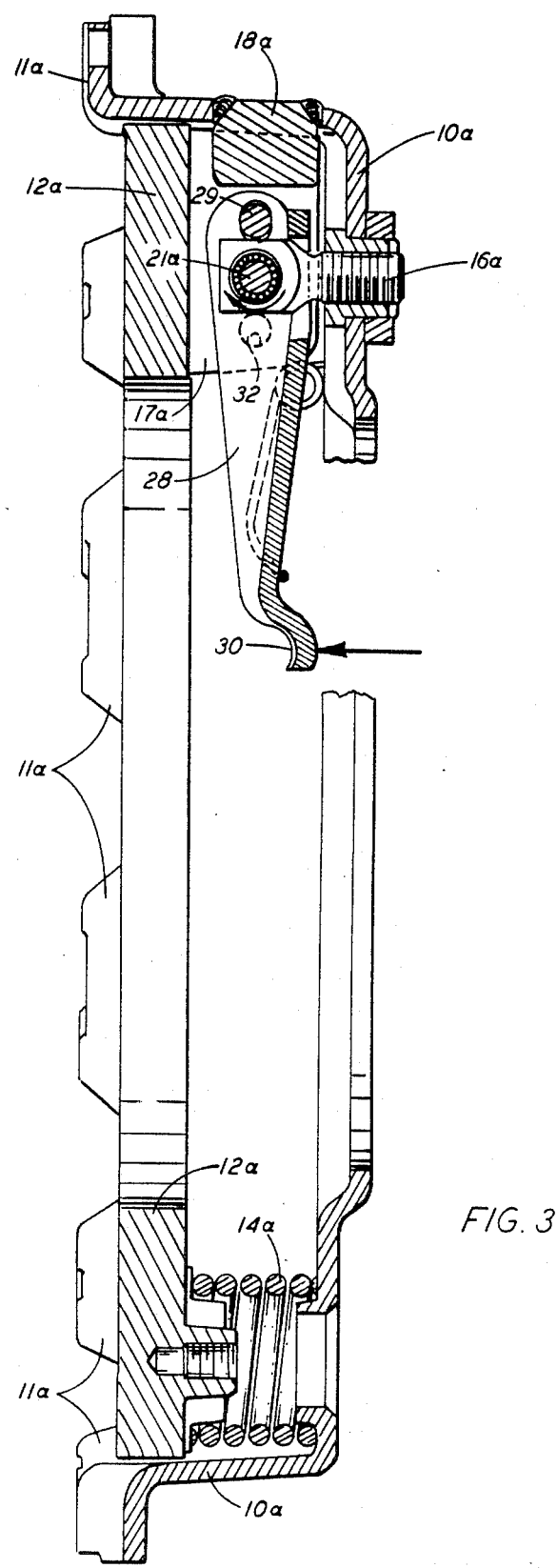
FIG. 3 is a vertical section corresponding to FIG. 2 but showing a push type clutch embodying the invention.

Reference is now made to FIG. 3 of the drawings wherein the clutch of the invention is constructed so as to operate as a push type clutch. From a comparison of FIGS. 3 and 2, it will be seen that the cover member 10a, pressure plate 12a, compression springs 14a and eye bolt assemblies 16a of FIG. 3 are all identical to their counterparts in FIG. 2 whereby these parts are interchangeable for the two clutch types. There is, however, a difference in the release levers 28 in the push type clutch of FIG. 3.

In the push type clutch each release lever 28 is pivotally connected to the pressure plate lugs 17a by means of a pivot pin 29 that is located above the eye bolt pivot point 21a as shown. With this arrangement, when the inner, free end 30 of the release lever 28 is pushed forwardly, or to the left in FIG. 3, the lever pivots in a clockwise direction about the eye bolt pivot point 21a which operates to move the pressure plate 12a to the right and disengages the clutch. During this pivotal movement, the eye bolt pivot point 21a acts as a fulcrum for the pivot connection at 29 between release lever 28 and pressure plate lugs 17a.

The opposite ends of the pivot pin 29 of the push type clutch are supported in bores 31 in the pressure plate lugs 17 and 17a, see FIG. 2. Similarly, the ends of the pivot pin 20 for the pull type clutch are supported in bores 32 in the pressure plate lugs 17 and 17a, see FIG. 3. With such an arrangement, the different release levers 15 and 28 can be used with the same pressure plate, cover member, eye bolt assemblies, etc. with commensurate economies in tooling and parts inventories.

The actuating means for the release levers 28 of the push type clutch is also conventional and can be similar to those described in U.S. Pat. Nos. 3,833,099 and 4,036,338, both owned by the assignee of this application, and both of which disclose push type clutches.

From the foregoing description it will be apparent that the invention provides a novel and advantageous clutch construction that enables the clutch to operate as either a push or pull type clutch with only a minimal change in working parts. As will be understood by those familiar with the art, the invention may be embodied in other specific forms without departing from the spirit or essential characteristics thereof.

I claim:

1. In a friction clutch for connecting driving and driven shafts; a dished cover member; a pressure plate located in the cover member; means biasing the pressure plate into engagement with a friction disc when the clutch is engaged; and means for moving the pressure plate out of engagement with the friction disc to disengage the clutch; said last-named means including a release lever pivotally connected adjacent one end to the cover member, an outwardly projecting lug on the pressure plate located adjacent the release lever pivot connection, and release lever connection means at alternate locations in the pressure plate lug, the release lever being adapted to be pivotally connected to the lug at one of said locations so that movement of the free end of the lever operates to move the plate out of engagement with the friction disc, a connection between the lever and lug at the first of said alternate locations requiring movement of the free end of the lever toward the pressure plate to disengage the clutch and a connection between the lever and lug at the second of said alternate locations requiring movement of the free end of the lever away from the pressure plate to disengage the clutch.

2. A friction clutch as defined in claim 1 wherein the release lever is radially disposed in the clutch and its connection with the pressure plate lug is, with respect to the axis of the clutch, radially outward from its connection with the cover member whereby movement of the free end of the lever towards the pressure plate disengages the clutch, the cover member connection operating as a fulcrum during such movement.

3. A friction clutch as defined in claim 1 wherein the release lever is radially disposed in the clutch and its connection with the pressure plate lug is, with respect to the axis of the clutch, radially inward from its connection with the cover member whereby movement of the free end of the lever away from the pressure plate disengages the clutch, the cover member connection operating as a fulcrum during such movement.

4. In a push/pull friction clutch construction; a dished cover member; a pressure plate positioned in the cover member in axial alignment therewith; means biasing the pressure plate into engagement with a friction disc when the clutch is engaged; and means for moving the pressure plate out of engagement with the friction disc to disengage the clutch; said last-named means including at least one release lever pivotally connected adjacent its outer end to the cover member, the release lever being radially oriented in the clutch with its free, inner end extending inwardly towards the clutch axis, a lug on the pressure plate that projects outwardly toward the cover member, the lug being located in close proximity to the pivot connection between the release lever and cover member, and means for pivotally connecting the release lever to the pressure plate lug at one of two alternate locations thereon whereby movement of the free end of the lever operates to move the plate out of engagement with the friction disc, one of the alternate locations being radially outward from the pivot connection between the release lever and cover member and the other of said locations being radially inward from said lever-cover member pivot connection, the lever being moved toward the pressure plate to disengage the clutch when it is pivotally connected to the radially outward alternate location and being moved away from the pressure plate to disengage the clutch when it is pivotally connected to the radially inward alternate location.

5. A clutch construction as defined in claim 4 wherein the release lever-cover member pivot connection operates as a fulcrum during the pivotal movement of the lever.

* * * * *